United States Patent
Tokuda

(10) Patent No.: US 12,451,482 B2
(45) Date of Patent: Oct. 21, 2025

(54) SLURRY FOR SECONDARY BATTERIES, POSITIVE ELECTRODE FOR SECONDARY BATTERIES, AND SECONDARY BATTERY

(71) Applicant: Panasonic Intellectual Property Management Co., Ltd., Osaka (JP)

(72) Inventor: Yuki Tokuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 671 days.

(21) Appl. No.: 17/273,826

(22) PCT Filed: Aug. 29, 2019

(86) PCT No.: PCT/JP2019/033829
§ 371 (c)(1),
(2) Date: Mar. 5, 2021

(87) PCT Pub. No.: WO2020/059450
PCT Pub. Date: Mar. 26, 2020

(65) Prior Publication Data
US 2021/0336257 A1   Oct. 28, 2021

(30) Foreign Application Priority Data
Sep. 18, 2018 (JP) ................. 2018-174072

(51) Int. Cl.
*H01M 4/50* (2010.01)
*H01M 4/02* (2006.01)
(Continued)

(52) U.S. Cl.
CPC ........... *H01M 4/502* (2013.01); *H01M 4/483* (2013.01); *H01M 2004/028* (2013.01); *H01M 4/667* (2013.01); *H01M 10/4235* (2013.01)

(58) Field of Classification Search
CPC ...... H01M 4/667; H01M 4/502; H01M 4/483; H01M 10/4235; H01M 2004/028
See application file for complete search history.

(56) References Cited

U.S. PATENT DOCUMENTS

2016/0190566 A1    6/2016 Shiozaki et al.
2019/0031522 A1*   1/2019 Ozaki ................. H01M 50/443
(Continued)

FOREIGN PATENT DOCUMENTS

CN    105742573 A    7/2016
JP     8-239222 A    9/1996
(Continued)

OTHER PUBLICATIONS

International Search Report dated Nov. 19, 2019, issued in counterpart International Application No. PCT/JP2019/033829 (2 pages).
(Continued)

*Primary Examiner* — Basia A Ridley
*Assistant Examiner* — Kimberly Wyluda
(74) *Attorney, Agent, or Firm* — WHDA, LLP

(57) ABSTRACT

This slurry for secondary batteries includes inorganic particles, a binding material, and a dispersion medium. The inorganic particles are formed from a metal compound, including as main components, an alkali metal and a metal other than alkaline earth metals, the contained amount of the alkali metal being 0.001-2 mass %. A positive electrode according to an embodiment of the present invention is provided with a collector, an intermediate layer formed on at least one surface of the collector, and a mixture layer formed on the intermediate layer. The intermediate layer includes the inorganic particles, a binding material, and a conductive material.

4 Claims, 2 Drawing Sheets

(51) Int. Cl.
*H01M 4/48* (2010.01)
*H01M 4/66* (2006.01)
*H01M 10/42* (2006.01)

(56) References Cited

U.S. PATENT DOCUMENTS

2019/0051906 A1* 2/2019 Rhee .......................... C01F 7/02
2020/0358105 A1* 11/2020 Tanabe .................. H01M 4/663

FOREIGN PATENT DOCUMENTS

| JP | 2001-202959 A | 7/2001 |
| JP | 2003-157852 A | 5/2003 |
| JP | 2008-501213 A | 1/2008 |
| JP | 2016-127000 A | 7/2016 |
| JP | 2018-138509 A | 9/2018 |
| JP | 2019-102427 A | 6/2019 |

OTHER PUBLICATIONS

English translation of Search Report dated Jan. 18, 2024, issued in counterpart CN Application No. 201980058571.1.(3 pages).

* cited by examiner

SLURRY FOR SECONDARY BATTERIES, POSITIVE ELECTRODE FOR SECONDARY BATTERIES, AND SECONDARY BATTERY

TECHNICAL FIELD

The present disclosure relates to a slurry for a secondary battery, a positive electrode for a secondary battery, and a secondary battery.

BACKGROUND ART

Conventionally, various slurries have been widely used in the production of secondary batteries, including a mixture slurry for forming a mixture layer of an electrode and an intermediate layer slurry for forming an intermediate layer (protective layer) on the surface of a positive electrode current collector. Patent Literature 1 discloses a positive electrode for a secondary battery in which an intermediate layer mainly including an aluminum oxide is formed between a current collector and a mixture layer. The intermediate layer is formed by applying onto the surface of the current collector an intermediate layer slurry including an aluminum oxide, a conductive agent, and a binder, and then drying the coating film.

CITATION LIST

Patent Literature

PATENT LITERATURE 1: Japanese Unexamined Patent Application Publication No. 2016-127000

SUMMARY

In order to stably form a good quality coating film (layer) by using a slurry for a secondary battery, it is important to ensure that the dispersibility of the material included in the slurry (the constituent material of the layer) is in good condition. An object of the present disclosure is to provide a slurry for a secondary battery with good dispersibility of the material without the use of additives that will impair, for example, the productivity and performance of the battery. In addition, another object of the present disclosure is to form an intermediate layer having good quality on the surface of a positive electrode current collector to improve battery performance.

The slurry for a secondary battery according to one aspect of the present disclosure is a slurry for a secondary battery including inorganic particles, a binder, and a dispersion medium, wherein the inorganic particles are composed of a metal compound mainly including a metal other than an alkali metal and an alkaline earth metal and containing at least one of 0.001 to 2% by mass of an alkali metal and 0.1 to 4% by mass of an alkaline earth metal.

The positive electrode for a secondary battery according to one aspect of the present disclosure comprises a current collector, an intermediate layer formed on at least one surface of the current collector, and a mixture layer formed on the intermediate layer. The intermediate layer includes inorganic particles, a conductive agent, and a binder, and the inorganic particles are composed of a metal compound mainly including a metal other than an alkali metal and an alkaline earth metal and containing at least one of 0.001 to 2% by mass of an alkali metal and 0.1 to 4% by mass of an alkaline earth metal.

The secondary battery according to one aspect of the present disclosure comprises the above positive electrode, a negative electrode, and an electrolyte.

The slurry for a secondary battery according to one aspect of the present disclosure can improve the dispersibility of the material such as inorganic particles included in the slurry without the use of additives that will impair, for example, the productivity and performance of the battery. In addition, the secondary battery comprising the positive electrode according to one aspect of the present disclosure has low internal resistance and has excellent input-output characteristics, for example.

DESCRIPTION OF EMBODIMENTS

Figure 1:
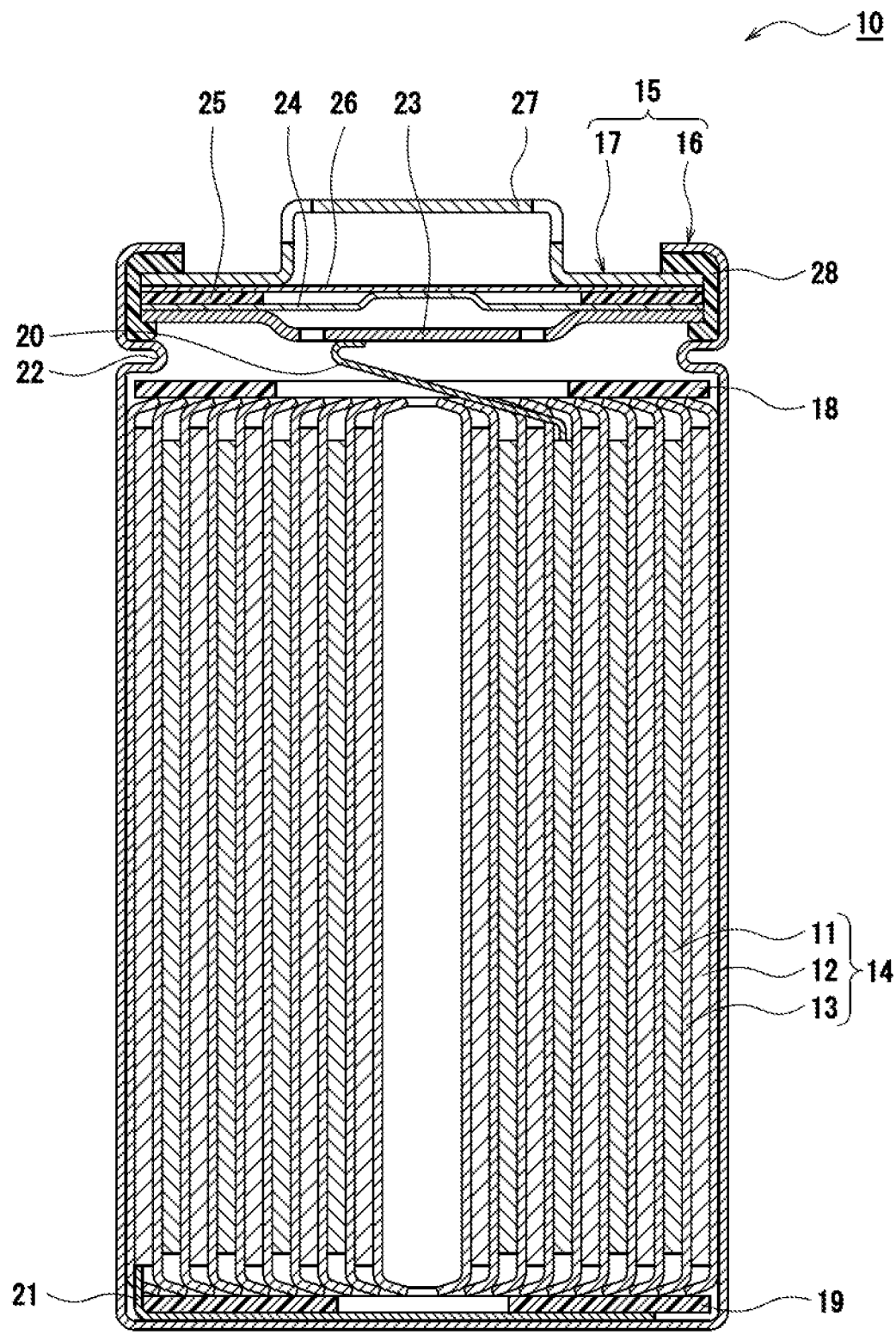
FIG. 1 is a sectional view of a secondary battery according to an example of the embodiment.

In order to stably form an intermediate layer having good quality and the like by using a slurry for a secondary battery, it is necessary to ensure that the dispersibility of the inorganic particles included in the slurry is in good condition. The present inventors have focused on such a problem and intensively investigated, and as a result, it has been found that the dispersibility of the inorganic particles is improved due to reduction in the viscosity of the slurry by using the inorganic particles that are composed of a metal compound mainly including a metal other than an alkali metal and an alkaline earth metal and containing at least one of 0.001 to 2% by mass of an alkali metal and 0.1 to 4% by mass of an alkaline earth metal. The slurry for a secondary battery according to the present disclosure has good coatability and can form an intermediate layer having good quality, for example.

An internal short circuit occurs in the battery, causing a risk of a large amount of heat generated by a redox reaction between the positive electrode current collector including aluminum as the main component and the lithium-containing transition metal oxide as the positive electrode active material. The intermediate layer mainly including the above inorganic particles is provided between the positive electrode current collector and the positive electrode mixture layer to separate the positive electrode current collector from the positive electrode mixture layer, allowing suppression of heat generation when an abnormality occurs. Insulating inorganic particles are included in the intermediate layer, causing a risk of the increase in internal resistance of the battery during normal charge-and-discharge of the battery. The intermediate layer having good quality according to the present disclosure means an intermediate layer in which the increase in the internal resistance caused by the intermediate layer included inside the battery is alleviated by using the metal compound containing at least one of 0.001 to 2% by mass of an alkali metal and 0.1 to 4% by mass of an alkaline earth metal as the inorganic particles of the intermediate layer.

Hereinafter an example of the embodiment of the slurry for a secondary battery, the positive electrode for a secondary battery, and the secondary battery according to the present disclosure will be described in detail. Hereinafter, an intermediate layer slurry for forming an intermediate layer on the surface of a positive electrode current collector will be exemplified as an example of the embodiment, but the slurry for a secondary battery according to the present disclosure is not limited thereto.

In addition, hereinafter an example of the embodiment of the positive electrode for a secondary battery and the secondary battery according to the present disclosure will be described in detail. Hereinafter, a cylindrical battery in which a wound electrode body 14 is housed in a cylindrical battery case is exemplified, and the electrode assembly is not limited to the wound type, and may be a laminate in which a plurality of positive electrodes and a plurality of negative electrodes are alternately laminated one by one via a separator. In addition, the secondary battery according to the present disclosure may be a rectangular battery having a rectangular metal case, a coin battery having a coin-shaped metal case, or the like, and a laminated battery including an exterior body being composed of a laminate sheet including a metal layer and a resin layer.

FIG. 1 is a sectional view of a secondary battery 10 according to an example of the embodiment. As illustrated in FIG. 1, the secondary battery 10 includes an electrode assembly 14, a electrolyte, and a battery case 15 that houses the electrode assembly 14 and the electrolyte. The electrode assembly 14 includes a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16. The secondary battery 10 may be a secondary battery using an aqueous electrolyte, or may be a secondary battery using a non-aqueous electrolyte. Hereinafter, the secondary battery 10 will be described as a non-aqueous electrolyte secondary battery such as a lithium ion battery using a non-aqueous electrolyte.

A non-aqueous electrolyte includes a non-aqueous solvent and an electrolyte salt dissolved in the non-aqueous solvent. For example, esters, ethers, nitriles, amides, and a mixed solvent of two or more thereof may be used as the non-aqueous solvent. The non-aqueous solvent may contain a halogen substitute such as a fluoroethylene carbonate in which at least a part of hydrogen of these solvents is substituted with a halogen atom such as fluorine. The non-aqueous electrolyte is not limited to a liquid electrolyte, and may be a solid electrolyte. A lithium salt such as $LiPF_6$ is used as the electrolyte salt.

The secondary battery 10 includes insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead 20 is connected to the lower surface of a bottom plate 23 of the sealing assembly 17, by welding or the like, and a cap 27, which is a top plate of the sealing assembly 17 electrically connected to the bottom plate 23, serves as a positive electrode terminal. The negative electrode lead 21 is connected to the inner surface of bottom of the exterior can 16 by welding or the like, and the exterior can 16 serves as a negative electrode terminal.

The exterior can 16 is a metal container with a bottomed cylindrical shape. A gasket 28 is provided between the exterior can 16 and the sealing assembly 17 to ensure the sealability inside the battery. The exterior can 16 has a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a bottom plate 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

Hereinafter, the positive electrode 11, the negative electrode 12, and the separator 13 constituting the electrode assembly 14, particularly the positive electrode 11 and the intermediate layer slurry for forming an intermediate layer 32 of the positive electrode 11 will be described in detail.

[Positive Electrode]

Figure 2:
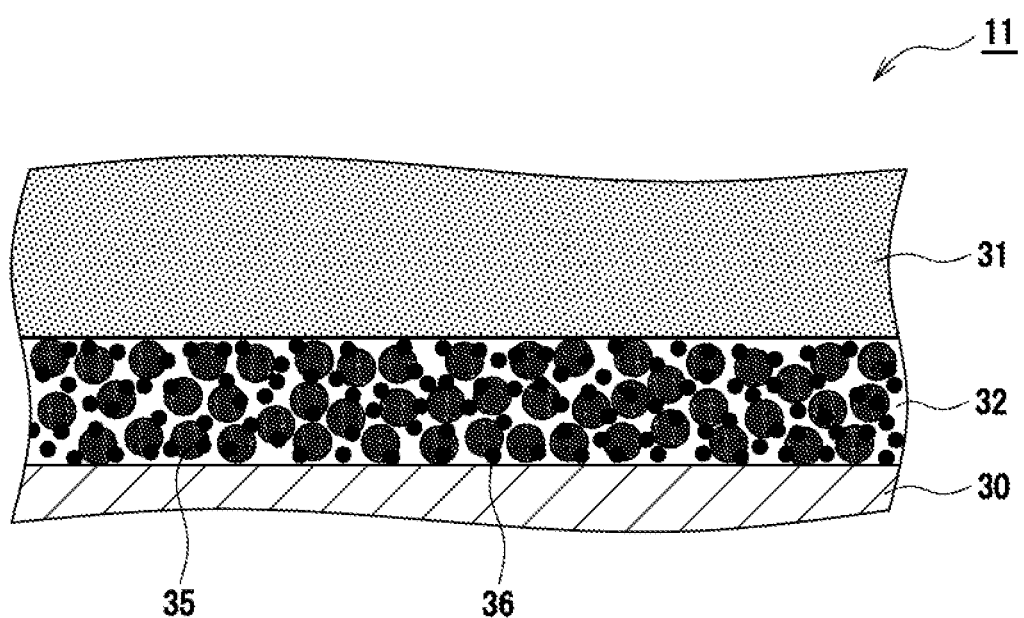
FIG. 2 is a sectional view of a positive electrode according to an example of the embodiment.

FIG. 2 is a sectional view of the positive electrode 11 according to an example of the embodiment. As exemplified in FIG. 2, the positive electrode 11 comprises: a positive electrode current collector 30; an intermediate layer 32 formed on at least one surface of the positive electrode current collector 30; and a positive electrode mixture layer 31 formed on the intermediate layer 32. The intermediate layer 32 is preferably formed on both sides of the positive electrode current collector 30. The positive electrode mixture layer 31 includes a positive electrode active material, a conductive agent, and a binder, and is formed on both sides of the positive electrode current collector 30 via the intermediate layer 32. The surface of the positive electrode current collector 30 may have an area in which the intermediate layer 32 is not formed, and in this area, the positive electrode mixture layer 31 is formed directly on the positive electrode current collector 30.

The positive electrode 11 is produced by applying the intermediate layer slurry on both sides of the positive electrode current collector 30, drying the coating film to form the intermediate layer 32, and then forming a positive electrode mixture layer 31 on the intermediate layer 32. The positive electrode mixture layer 31 is formed on both sides of the positive electrode current collector 30 via the intermediate layer 32 by applying onto the intermediate layer 32 a positive electrode mixture slurry including a positive electrode active material, a conductive agent, a binder, and the like, drying the coating film, and then compressing the coating film.

A foil of a metal stable in the potential range of the positive electrode 11 such as aluminum or aluminum alloy, a film in which the metal is disposed on the surface, or the like can be used as the positive electrode current collector 30. The content of aluminum in the positive electrode current collector 30 is 50% or more, preferably 70% or more, and more preferably 80% or more with respect to the mass of the current collector. The preferable positive electrode current collector 30 is a metal foil consisting of aluminum or an aluminum alloy and has a thickness of 5 μm to 20 μm.

A lithium-containing transition metal oxide containing transition metal elements such as Co, Mn, and Ni is used as the positive electrode active material. Examples of the lithium-containing transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of the group consisting of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq 2.3$). These may be used singly or in combination of two or more.

Examples of the conductive agent included in the positive electrode mixture layer 31 include carbon materials such as carbon black (CB), acetylene black (AB), ketjen black, and graphite. Examples of the binder included in the positive electrode mixture layer 31 include fluorine resins such as polytetrafluoroethylene (PTFE) and polyvinylidene fluoride (PVdF), polyacrylonitrile (PAN), polyimide resins, acrylic resins, and polyolefin resins. In addition, these resins may be used in combination with carboxymethylcellulose (CMC) or a salt thereof or polyethylene oxide (PEO). These may be used singly or in combination of two or mare.

As described above, the intermediate layer 32 is interposed between the positive electrode current collector 30 and the positive electrode mixture layer 31. The intermediate layer 32 includes inorganic particles 35 and a binder, and is composed of the inorganic particles 35 as the main component. The main component means a component with the highest mass among the constituent materials of the intermediate layer 32. The content of the inorganic particles 35 is preferably 70 to 99% by mass, more preferably 80 to 98% by mass, and particularly preferably 90 to 97% by mass, with respect to the mass of the intermediate layer 32. The thickness of the intermediate layer 32 is not particularly limited, but is preferably 1 μm to 10 μm or 1 μm to 5 μm.

The inorganic particles 35 are composed of a metal compound mainly including a metal other than an alkali metal and an alkaline earth metal and containing at least one of 0.001 to 2% by mass of an alkali metal and 0.1 to 4% by mass of an alkaline earth metal.

The inorganic particles 35 are composed of a metal compound mainly including a metal other than an alkali metal and an alkaline earth metal and containing 0.001 to 2% by mass of an alkali metal (Li, Na, K, Rb, Sc, and Fr). The inclusion of 0.001 to 2% by mass of the alkali metal in the metal compound results in formation of intermediate layer having good quality 32 and reduction in the internal resistance of the battery. The content of the alkali metal is 0.001 to 2% by mass, preferably 0.005 to 1.5% by mass, and more preferably 0.01 to 1% by mass, with respect to the mass of the inorganic particles 35. The preferable alkali metal contained in the metal compound is Na and K. One alkali metal may be added, or two or more alkali metals may be added to the metal compound. The inorganic particles 35 containing 0.001 to 2% by mass of the alkali metal may further contain 0.1 to 4% by mass of an alkaline earth metal.

The metal compound constituting the inorganic particles 35 is preferably a metal compound having a lower oxidizing power than the lithium-containing transition metal oxide. The metal compound contains at least one selected from, for example, Mn, Si, Ti, and Al as a metal element other than the alkali metal and alkaline earth metal. The metal compound is at least one selected from, for example, a metal oxide and a metal hydroxide. Specific examples of the preferable metal compound (oxide and hydroxide) include manganese oxide, silicon dioxide (silica), titanium dioxide (titania), aluminum oxide (alumina), aluminum hydroxide, and boehmite. Of these, at least one selected from aluminum oxide, aluminum hydroxide, and boehmite is preferably the main component.

When the metal compound is, for example, aluminum oxide, aluminum hydroxide, or boehmite containing 0.001 to 2% by mass of an alkali metal, the main component of the metal element contained in the compound (the component having the highest mass) is Al. When the metal compound is, for example, silica containing 0.001 to 2% by mass of an alkali metal, the main component of the metal element contained in the compound is Si. When the metal compound is, for example, titania containing 0.001 to 2% by mass of an alkali metal, the main component of the metal element contained in the compound is Ti. A preferable example of the metal compound is aluminum oxide, aluminum hydroxide, or boehmite containing 0.01 to 1% by mass of Na or K with respect to the mass of the inorganic particles 35.

The inorganic particles 35 are composed of a metal compound mainly including a metal other than an alkali metal and an alkaline earth metal and containing 0.1 to 4% by mass of an alkaline earth metal (Be, Mg, Ca. Sr. Ba, and Ra). The inorganic particles 35 containing 0.1 to 4% by mass of the alkaline earth metal may further contain 0.001 to 2% by mass of an alkali metal.

The addition of the alkaline earth metal contributes to the formation of intermediate layer having good quality 32. The content of the alkaline earth metal is 0.1 to 4% by mass, preferably 0.2 to 3% by mass, and more preferably 0.5 to 2% by mass, with respect to the mass of the inorganic particles 35. The preferable alkaline earth metal contained in the metal compound is Mg, Ca, Sr, and Ba. One alkaline earth metal may be added, or two or more alkaline earth metals may be added to the metal compound.

The metal compound is, for example, aluminum oxide, aluminum hydroxide, or boehmite containing 0.01 to 1% by mass of Na or K and 0.1 to 4% by mass of Mg, Ca, Sr, or Ba with respect to the mass of the inorganic particles 35.

The volume-based median diameter (D50) of the inorganic particles 35 is, for example, 0.05 μm to 2 μm, and is preferably 0.1 μm to 1 μm. The median diameter of the inorganic particles 35 is a particle size at which the volume integrated value is 50% in the particle size distribution measured by the laser diffraction scattering method. In addition, the aspect ratio of the inorganic particles 35 may be 2 or more. The intermediate layer 32 may include two or more of inorganic particles 35 with, for example, different composition and particle size, and may include inorganic particles other than the inorganic particles 35 and a conductive agent 36 as long as the object of the present disclosure is not impaired.

The intermediate layer 32 may include metal phosphate particles. Specific examples thereof include $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, $MgHPO_4$, $LiCl-Li_5P_3O_{10}$, $LiCl-Li_7P_5O_{16}$, $LiCl-LiPO_3$, $LiCl-Li_2O-P_2O_5$, $Li_2O-P_2O_5$, $AgI-AgPO_3$, $CuI-CuPO_3$, $PbF_2-MnF_2-Al(PO_4)_3$, $AgI-Ag_2O-P_2O_5$, $AlPO_4$, and $Mn_3(PO_4)_2\cdot 3H_2O$. Of these, at least one selected from lithium phosphate ($Li_3PO_4$ particles), lithium hydrogen phosphate ($Li_2HPO_4$), aluminum phosphate ($AlPO_4$), and manganese phosphate hydrate ($Mn_3(PO_4)_2\cdot 3H_2O$) is preferable.

One that is the same as the conductive agent applied to the positive electrode mixture layer 31 can be used as the binder included in the intermediate layer 32, for example fluorine resins such as PTFE and PVdF. PAN, polyimide resin, acrylic resin, and polyolefin resin. Of these, PVdF is preferable. The content of the binder is preferably 0.1 to 10% by mass, and more preferably 1 to 5% by mass, with respect to the mass of the intermediate layer 32. The contents of the inorganic particles 35, the conductive agent 36, and the binder in the intermediate layer 32 are determined by observing the cross section of the intermediate layer 32 with a scanning electron microscope (SEM) or a transmission electron microscope (TEM) and element mapping.

As described above, the intermediate layer 32 can be formed by applying onto the surface of the positive electrode current collector 30 an intermediate layer slurry including the constituent material of the intermediate layer 32, and then drying the coating film. The intermediate layer slurry is applied in a conventionally known manner. The intermediate layer 32 is formed on the surface of the positive electrode current collector 30 at a surface density of, for example, 0.1 $g/m^2$ to 20 $g/m^2$.

The intermediate layer slurry preferably includes the conductive agent 36 to form a conductive path in the intermediate layer 32. During normal charge-and-discharge of the battery, the insulation performance is preferably alleviated by including the inorganic particles 35 in the intermediate layer 32. To alleviate the insulating property by the inorganic particles 35, the intermediate layer 32 preferably includes the conductive agent 36.

One that is the same as the conductive agent applied to the positive electrode mixture layer 31 can be used as the conductive agent 36 included in the intermediate layer 32, for example, conducting particles such as CB, AB, ketjen black, and graphite. The conductive agent 36 attaches to the surface of the inorganic particles 35 by the binder and forms a conductive path in the intermediate layer 32. The content of the conductive agent 36 is preferably 0.5 to 10% by mass, and more preferably 1 to 5% by mass, with respect to the mass of the intermediate layer 32. When the content of the conductive agent 36 is within this range, a good conductive path will be formed in the intermediate layer 32.

The intermediate layer slurry is a slurry for a secondary battery, including the inorganic particles 35, a binder, and a dispersion medium. When the intermediate layer 32 includes the conductive agent 36, the intermediate layer slurry also includes the conductive agent 36. As described above, the inorganic particles 35 are composed of a metal compound mainly including a metal other than an alkali metal and an alkaline earth metal and containing at least one of 0.001 to 2% by mass of an alkali metal and 0.1 to 4% by mass of an alkaline earth metal. Adding 0.001 to 2% by mass of an alkali metal to the metal compound improves the dispersibility of the inorganic particles 35 and reduces the viscosity of the slurry to improve the coatability of the slurry. This allows intermediate layer having good quality 32 to be formed and improves battery performance.

The metal compound containing 0.001 to 2% by mass of an alkali metal may further contain 0.1 to 4% by mass of an alkaline earth metal.

The preferable element and the preferable content of the alkali metal and alkaline earth metal are described above. The metal compound is at least one selected from, for example, a metal oxide and a metal hydroxide, and specifically, the main component is preferably at least one selected from aluminum oxide, aluminum hydroxide, and boehmite.

The inorganic particles 35 are produced by immersing the particles of a metal compound containing a metal element such as Mn, Si, Ti, and Al in an aqueous solution of an alkali metal compound such as an aqueous solution of sodium hydroxide and an aqueous solution of potassium hydroxide, and then drying and firing the particles. In addition, when an alkaline earth metal is added to the metal compound, the inorganic particles 35 are produced by mixing the powder of an alkaline earth metal compound such as magnesium oxide and calcium oxide with the particles of a metal compound containing a metal element such as Mn, Si, Ti, and Al, and then firing the mixed particles. Firing is performed at a temperature of 1200 to 1600° C., for example, in the atmosphere.

The solid content concentration of the intermediate layer slurry is preferably 30 to 50% by mass, and more preferably 35 to 45% by mass. As long as the solid content concentration is within the above range, it is easy to form the intermediate layer 32 with a thickness of 1 μm to 10 μm. When the solid content concentration is less than 30% by mass, the viscosity of the slurry will decrease, but production problems will occur, such as the requirement of long time for drying of the coating film. The viscosity (25° C.) of the intermediate layer slurry measured by using a B-type viscometer is preferably 30 to 80 cP or 40 to 70 cP. Using the inorganic particles 35 can achieve a viscosity of 40 to 70 cP at a solid content concentration of 30 to 50% by mass.

The dispersion medium of the intermediate layer slurry is not particularly limited as long as it is a liquid that can be removed by volatilization, and can be changed appropriately depending on, for example, the type of a binder. For example, an organic solvent or water similar to the dispersion medium used for the mixture slurry can be used as a dispersion medium. The dispersion medium may be a liquid that does not dissolve the inorganic particles 35 and the binder, or may be a liquid that does not dissolve the inorganic particles 35 and dissolves the binder. An example of a preferable dispersion medium is N-methyl-2-pyrolidone (NMP).

The intermediate layer slurry can be prepared by adding the mixed powder of the inorganic particles 35 and the binder to a dispersion medium and mixing by using a conventionally known stirring apparatus. Alternatively, each powder may be added to the dispersion medium and the dispersion medium may be added to the mixed powder. The amount of the inorganic particles 35 added is preferably 70 to 99% by mass, more preferably 80 to 98% by mass, and particularly preferably 90 to 97% by mass, with respect to the total mass of the solid content. When only the inorganic particles 35, the conductive agent 36, and the binder are included as the solid content, the total amount of the conductive agent 36 and the binder added is 1 to 30% by mass and particularly preferably 3 to 10% by mass.

[Negative Electrode]

A negative electrode 12 comprises a negative electrode current collector and a negative electrode mixture layer formed on at least one surface of the negative electrode current collector. A foil of a metal stable in the potential range of the negative electrode 12 such as copper or copper alloy, a film in which the metal is disposed on the surface, or the like can be used as the negative electrode current collector. Preferably, the negative electrode mixture layer includes a negative electrode active material and a binder, and is formed on both sides of the negative electrode current collector. The negative electrode 12 can be produced by applying a negative electrode mixture slurry including a negative electrode active material and a binder onto a negative electrode current collector, drying the coating film, and then compressing to form the negative electrode mixture layer on both sides of the negative electrode current collector.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as lump artificial graphite and graphitized mesophase carbon microbeads. In addition, as the negative electrode active material, metals such as Si and Sn that are alloyed with Li, metal compounds including Si and Sn, and lithium titanium composite oxides may be used. The Si-containing compound represented by $SiO_x$ ($0.5 \leq x \leq 1.6$) may be used in combination with a carbon material such as graphite.

As a binder included in the negative electrode mixture layer, fluorine-containing resin such as PTFE and PVdF, PAN, polyimide, acrylic resin, and polyolefins may be used as in the case of the positive electrode 11, but styrene-butadiene rubber (SBR) is preferably used. In addition, the negative electrode mixture layer may include CMC or a salt thereof, polyacrylic acid (PAA) or a salt thereof, PVA, or the like. The negative electrode mixture layer 41 includes, for example, SBR and CMC or a salt thereof.

[Separator]

As a separator 13, a porous sheet having ion permeability and insulating property is used. Specific examples of the porous sheet include a microporous thin film, a woven fabric, and a non-woven fabric. As the material of the separator, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

EXAMPLES

Hereinafter, the present disclosure will be further described with reference to examples, but the present disclosure is not limited to these examples.

Example 1

[Production of Positive Electrode]

Aluminum oxide ($Al_2O_3$) particles were added to an aqueous solution of sodium hydroxide (NaOH) and were stirred, and then the particles were dried and fired under a condition of 1500° C. for 2 hours in the atmosphere, thereby producing $Al_2O_3$ particles containing 0.001% by mass of Na with respect to the total mass of the particles. Thereafter, 95 parts by mass of the $Al_2O_3$ particles, 2 parts by mass of acetylene black (AB), and 3 parts by mass of polyvinylidene fluoride (PVdF) were mixed to prepare an intermediate layer slurry having a solid content concentration of 40% by mass with N-methyl-2-pyrolidone (NMP) as a dispersion medium. The slurry was applied onto both sides of a positive electrode current collector consisting of aluminum foil with a thickness of 15 μm and the coating film was dried to form an intermediate layer with a thickness of 3 μm.

The content of Na in the $Al_2O_3$ particles was measured by ICP emission spectrometry. In addition, the dispersibility of the $Al_2O_3$ particles and AB particles in the intermediate layer slurry was good, and the viscosity (25° C.) of the intermediate layer slurry was 60 cP. The viscosity of the slurry was measured by using a B-type viscometer under a condition of 20 rpm.

A lithium-containing transition metal oxide represented by $LiNi_{0.5}Co_{0.2}Mn_{0.3}O_2$ was used as a positive electrode active material. A positive electrode active material, AB, and PVdF were mixed in a solid content mass ratio of 97:2:1 to prepare a positive electrode mixture slurry with NMP as a dispersion medium. Thereafter, the positive electrode mixture slurry was applied onto both sides of the positive electrode current collector on which the intermediate layer was formed, the coating film was dried, and the coating film was compressed to form a positive electrode mixture layer on both sides of the current collector via the intermediate layer. The current collector was cut into a predetermined electrode size to produce a positive electrode.

[Production of Negative Electrode]

Graphite powder, sodium salt of CMC, and dispersion of SBR were mixed at a solid content mass ratio of 98.7:0.7:0.6 to prepare a negative electrode mixture slurry with water as a dispersion medium. Thereafter, the negative electrode mixture slurry was applied onto both sides of the negative electrode current collector consisting of copper foil, the coating film was dried, and the coating film was compressed to form a negative electrode mixture layer on both sides of the current collector. The current collector was cut into a predetermined electrode size to produce a negative electrode.

[Preparation of Non-Aqueous Electrolyte]

Ethylene carbonate (EC), ethyl methyl carbonate (EMC), and dimethyl carbonate (DMC) were mixed in a volume ratio of 3:3:4. $LiPF_6$ was dissolved in the mixed solvent so as to obtain a concentration of 1.2 mol/L to prepare a non-aqueous electrolyte.

[Production of Battery]

An aluminum lead was attached to the above positive electrode, a nickel lead was attached to the above negative electrode, and the positive electrode and the negative electrode were spirally wound via a polyethylene separator to produce a wound electrode assembly. The electrode assembly was accommodated in a bottomed cylindrical battery case body having an outer diameter of 18.2 mm and a height of 65 mm, the above non-aqueous electrolyte solution was injected therein, the opening of the battery case body was sealed with a gasket and a sealing assembly to produce a cylindrical non-aqueous electrolyte secondary battery.

[Measurement of DC-IR (Direct Current Resistance)]

The measurement was performed by the following procedure for the above battery. The evaluation results are shown in Table 1 (the same applies to the following examples and comparative examples).

Under an ambient temperature of 25° C., the battery was charged to a battery voltage of 4.35 V at a constant current of 0.3 C, then charged to a current value of 0.05 C at a constant voltage, and then discharged at a constant current of 0.3 C to set SOC to 50%. Thereafter, the voltage value was obtained when discharge currents of 0 A, 0.1 A, 0.5 A, and 1.0 A were applied for 10 seconds. The voltage value after 10 seconds against each of the discharge current values was linearly approximated by the method of least squares, and the value of DC-IR was calculated from the absolute value of the slope of the line.

Example 2

A positive electrode and secondary battery were produced in the same manner as in Example 1 except that the content of Na in the Al$_2$O$_3$ particles was changed to 0.02% by mass in preparation of the intermediate layer slurry, and the performance was evaluated.

Example 3

A positive electrode and secondary battery were produced in the same manner as in Example 2 except that the aqueous solution of sodium hydroxide (NaOH) and magnesium oxide (MgO) particles were mixed and fired under a condition of 1500° C. for 2 hours in the atmosphere to add 0.02% by mass of Na and 0.5% by mass of Mg in preparation of the intermediate layer slurry, and the performance was evaluated.

Example 4

A positive electrode and secondary battery were produced in the same manner as in Example 3 except that Al$_2$O$_3$ particles containing 0.1% by mass of Na and 3% by mass of Mg were used instead of the inorganic particles used in Example 3 in preparation of the intermediate layer slurry, and the performance was evaluated.

Example 5

A positive electrode and secondary battery were produced in the same manner as in Example 3 except that Al$_2$O$_3$ particles containing 1% by mass of Na and 2% by mass of Mg were used instead of the inorganic particles used in Example 3 in preparation of the intermediate layer slurry, and the performance was evaluated. An aqueous solution of potassium hydroxide (KOH) was used instead of a NaOH aqueous solution to add K to Al$_2$O$_3$.

Example 6

A positive electrode and secondary battery were produced in the same manner as in Example 3 except that Al$_2$O$_3$ particles containing 1% by mass of K and 2% by mass of Mg were used instead of the inorganic particles used in Example 3 in preparation of the intermediate layer slurry, and the performance was evaluated. An aqueous solution of potassium hydroxide (KOH) was used instead of a NaOH aqueous solution to add K to Al$_2$O$_3$.

Example 7

A positive electrode and secondary battery were produced in the same manner as in Example 3 except that Al$_2$O$_3$ particles containing 2% by mass of Na and 4% by mass of Ca were used instead of the inorganic particles used in Example 3 in preparation of the intermediate layer slurry, and the performance was evaluated. Calcium oxide (CaO) was used instead of MgO to add Ca to Al$_2$O$_3$.

Example 8

A positive electrode and secondary battery were produced in the same manner as in Example 1 except that boehmite (AlOOH) particles were used instead of Al$_2$O$_3$ particles and the content of Na was set to 1% by mass in preparation of the intermediate layer slurry, and the performance was evaluated.

Example 9

A positive electrode and secondary battery were produced in the same manner as in Example 8 except that aluminum hydroxide (Al(OH)$_3$) particles were used instead of AlOOH particles in preparation of the intermediate layer slurry, and the performance was evaluated.

Example 10

A positive electrode and secondary battery were produced in the same manner as in Example 1 except that titanium oxide (TiO$_2$) particles were used instead of Al$_2$O$_3$ particles and the content of Na was set to 0.1% by mass in preparation of the intermediate layer slurry, and the performance was evaluated.

Example 11

A positive electrode and secondary battery were produced in the same manner as in Example 10 except that the aqueous solution of sodium hydroxide (NaOH) and magnesium oxide (MgO) particles were mixed and fired under a condition of 1500° C. for 2 hours in the atmosphere to add 0.1% by mass of Na and 0.5% by mass of Mg in preparation of the intermediate layer slurry, and the performance was evaluated.

Example 12

A positive electrode and secondary battery were produced in the same manner as in Example 1 except that magnesium hydroxide (Mg(OH)$_2$) was mixed instead of NaOH and fired under a condition of 1500° C. for 2 hours in the atmosphere to produce Al$_2$O$_3$ particles containing 2.0% by mass of Mg with respect to the total mass of the particles in preparation of the intermediate layer slurry, and the performance was evaluated.

Comparative Example 1

A positive electrode and secondary battery were produced in the same manner as in Example 1 except that an alkali metal and alkaline earth metal were not added to Al$_2$O$_3$ particles in preparation of the intermediate layer slurry.

Comparative Example 2

A positive electrode and secondary battery were produced in the same manner as in Example 1 except that an alkali metal and alkaline earth metal were not added to TiO$_2$ particles in preparation of the intermediate layer slurry.

TABLE 1

| | Inorganic particles | | | Slurry | Battery |
|---|---|---|---|---|---|
| | Main material | Alkali metal | Alkaline earth metal | Viscosity (cP) | DC-IR (mΩ) |
| Example 1 | $Al_2O_3$ | Na: 0.001 wt % | — | 60 | 35 |
| Example 2 | $Al_2O_3$ | Na: 0.02 wt % | — | 50 | 30 |
| Example 3 | $Al_2O_3$ | Na: 0.02 wt % | Mg: 0.5 wt % | 50 | 30 |
| Example 4 | $Al_2O_3$ | Na: 0.1 wt % | Mg: 3 wt % | 40 | 25 |
| Example 5 | $Al_2O_3$ | Na: 1 wt % | Mg: 2 wt % | 40 | 25 |
| Example 6 | $Al_2O_3$ | K: 1 wt % | Mg: 2 wt % | 45 | 28 |
| Example 7 | $Al_2O_3$ | Na: 2 wt % | Ca: 4 wt % | 50 | 30 |
| Example 8 | AlOOH | Na: 1 wt % | — | 50 | 30 |
| Example 9 | $Al(OH)_3$ | Na: 1 wt % | — | 70 | 40 |
| Example 10 | $TiO_2$ | Na: 0.1 wt % | — | 70 | 40 |
| Example 11 | $TiO_2$ | Na: 0.1 wt % | Mg: 0.5 wt % | 50 | 30 |
| Example 12 | $Al_2O_3$ | — | Mg: 0.5 wt % | 50 | 30 |
| Comparative Example 1 | $Al_2O_3$ | — | — | 100 | 50 |
| Comparative Example 2 | $TiO_2$ | — | — | 100 | 50 |

As can be understood from the results shown in Table 1, all of the intermediate layer slurries in the examples have low viscosity and are superior in the dispersibility of inorganic particles compared to the slurry in Comparative Example 1 with the same solid content concentration. That is, it is considered that adding an alkali metal to metal compound particles as the main material at a predetermined concentration greatly improves the dispersibility of inorganic particles and reduces the viscosity of the slurry. The DC-IR values of all the batteries in the examples are lower than that in Comparative Example 1. It is considered that forming the intermediate layer with the slurry having excellent dispersibility of the inorganic particles forms an intermediate layer having good quality to reduce the DC-IR of the battery.

REFERENCE SIGNS LIST 10 secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 projecting portion
23 bottom plate
24 lower vent member
25 insulating member
26 upper vent member
27 cap
28 gasket D
30 positive electrode current collector
31 Positive electrode mixture layer
32 Intermediate layer
35 inorganic particles
36 conductive agent

The invention claimed is:

1. A positive electrode for a secondary battery, comprising:
a current collector;
an intermediate layer formed on at least one surface of the current collector; and
a mixture layer formed on the intermediate layer,
wherein the intermediate layer includes inorganic particles, a conductive agent, and a binder, and
the inorganic particles are composed of a metal compound comprising at least one element selected from Mn and Ti, and further containing at least one of 0.1 to 2% by mass of an alkali metal and 2 to 3% by mass of an alkaline earth metal,
wherein the inorganic particles are containing both the alkali metal and alkaline earth metal, and wherein the inorganic particles do not comprise alumina.

2. A secondary battery, comprising:
the positive electrode for a secondary battery according to claim 1;
a negative electrode; and
an electrolyte.

3. The positive electrode for a secondary battery according to claim 1, wherein the metal compound is at least one selected from a metal oxide and a metal hydroxide.

4. The positive electrode for a secondary battery according to claim 1, wherein the metal compound comprises at least one selected from manganese oxide, silicon dioxide, titanium dioxide, aluminum hydroxide, and boehmite.

* * * * *